March 17, 1953 P. P. NEWCOMB 2,631,432
ROTARY FLUID COUPLING AND THERMOSTATIC
CONTROL THEREFOR
Filed May 21, 1949

Inventor
Phillip P. Newcomb
by Charles A. Warren
Attorney

Patented Mar. 17, 1953

2,631,432

UNITED STATES PATENT OFFICE 2,631,432

ROTARY FLUID COUPLING AND THERMOSTATIC CONTROL THEREFOR

Philip P. Newcomb, Manchester, Conn., assignor to United Aircraft Corporation, East Hartford, Conn., a corporation of Delaware Application May 21, 1949, Serial No. 94,705

8 Claims. (Cl. 60—54)

This invention relates to a device for controlling the temperature of the working fluid of an hydraulic coupling.

A problem encountered in the use of hydraulic couplings for transmitting power is that of maintaining the temperature of the working fluid within limits which will prevent damage to any of the coupling parts. One or more small bleed holes venting the coupling chamber directly to the exterior of the coupling usually are provided on the periphery of the coupling casing to allow a circulation of fluid through the coupling. Under ordinary operating conditions, these bleeds are sufficient to prevent the temperature of the fluid within the coupling chamber from exceeding a safe limit.

However, under certain conditions such as operation at high slip or operation when the driven member overrides the driving member, heat is generated within a coupling faster than it can be dissipated and the temperature of the fluid will increase quickly with the possibility of damage to the coupling parts.

A feature of this invention is a temperature responsive device which will permit the working fluid to be discharged from the working chamber of an hydraulic coupling at an accelerated rate when overheating occurs.

A feature of this invention is an improved and simplified device for limiting the maximum temperature of the working fluid of an hydraulic coupling.

Another feature of this invention is a temperature responsive valve for controlling the rate of flow of the working fluid to an hydraulic coupling to assist in cooling the coupling when overheating occurs.

Other features and advantages will be apparent from the specification and claims and from the accompanying drawing which illustrates an embodiment of the invention.

Figure 1:
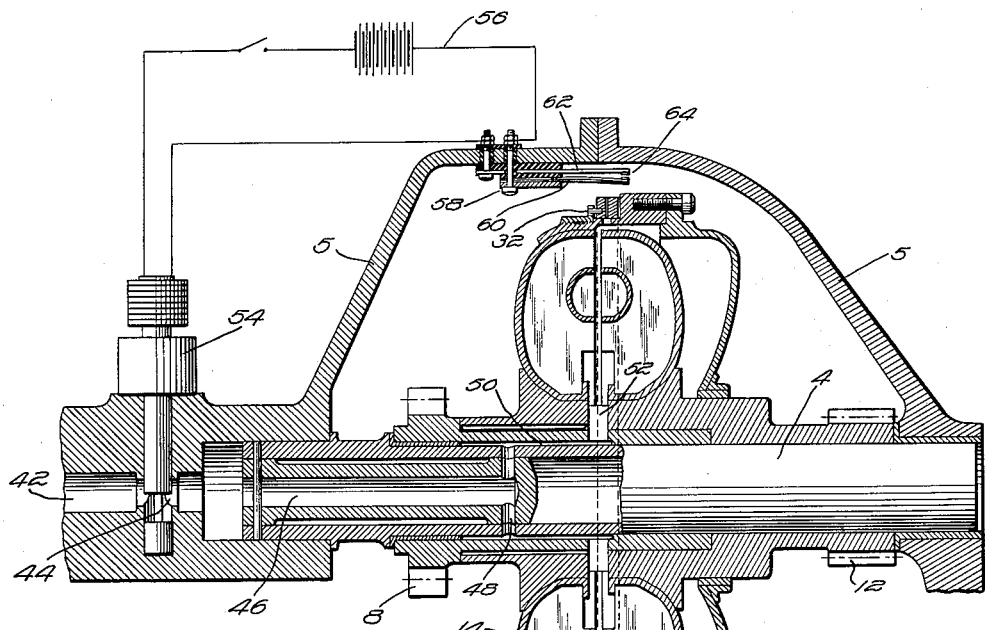
Fig. 1 is a cross-sectional view of the hydraulic coupling showing the temperature responsive device for controlling the rate of fluid flow through the coupling and the temperature responsive device for controlling the rate of fluid flow to the coupling.
Figure 2:
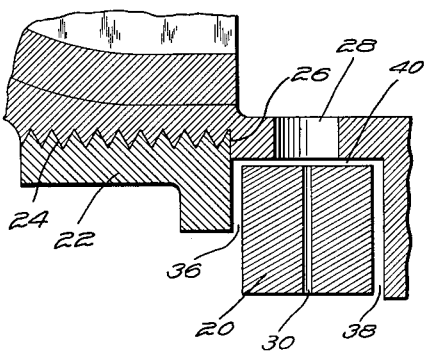
Fig. 2 is an enlarged section of the ring and the annular groove in the hydraulic coupling casing showing the passage formed when the ring is in its expanded position.

Referring to the drawing, hydraulic coupling 2 is supported by shaft 4 within casing 5. This coupling consists of impeller 6 rotatable on shaft 4 and driven by gear 8, and runner 10 which drives gear 12. The runner will be caused to rotate with the impeller when working fluid is admitted to chamber 14. The coupling 2 has a casing 16 having annular groove 18 around its periphery which groove carries ring 20. Detachable member 22 forms one wall of groove 18 and permits assembly of the ring in the groove. The internal diameter of member 22 is threaded as at 24 (Fig. 2), these threads cooperating with threads on the outside surface of the casing, and the member is positioned in an axial direction by shoulder 26. A number of ports 28 are provided around the periphery of the casing, the ports being in axial alignment with the center of groove 18.

Figure 3:
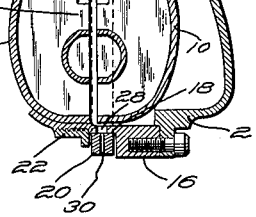
Fig. 3 is a detail view of the pin which prevents the ring from rotation relative to the hydraulic coupling casing.
Figure 3:
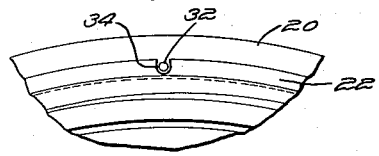

Ring 20 has bleed holes 30 located about its circumference, these bleed holes being of a smaller diameter than casing ports 28 with which they align. A pin 32 is provided on the left face of ring 20, this pin cooperating with radial groove 34 (Fig. 3) in member 22 to prevent rotation of the ring relative to the coupling casing. This permits bleeds 30 to be maintained in alignment with ports 28, but does not interfere with radial expansion of the ring. By means of the bleed holes, fluid is permitted at all times to drain from coupling chamber 14 thus insuring a circulation of fluid through the coupling which will prevent overheating under normal operating conditions. The ring is sufficiently narrower in width than groove 18 so that passages 36 and 38 (Fig. 2) are formed on either side of the ring.

Ring 20 is constructed of a material having a greater coefficient of expansion than the material from which coupling 16 and member 22 are constructed and, therefore, will expand at a greater rate than will casing 16 upon an increase in temperature. The ring is designed to fit tightly in the root of the groove under normal operating conditions. As the temperature of the coupling increases, this ring will move away from the root of the groove to permit additional flow of fluid from the coupling through ports 28 and clearance passage 40 (Fig. 2), formed by the difference in expansion between the ring and the casing, and through passages 36 and 38 at the sides of the ring to the exterior of the coupling. Tabs could be provided if desired at intervals along the faces of the ring to assure its being centrally located within the groove 18, but this feature is not considered essential.

For introducing working fluid to the coupling, casing 5 has a conduit 42 in line with shaft 4. The fluid passes through variable restriction 44, passage 46, and radial ports 48, to annulus 50 from where it passes into the coupling chamber 14 by means of passage 52. Fluid flow to the coupling may be regulated by means of a valve not shown, the supply of fluid within the chamber 14 determining the amount of power being transmitted by the coupling impeller to the coupling runner.

The variable restriction 44 is operated by solenoid 54 which is part of electrical circuit 56. A bimetallic switch 58 is provided in this circuit, the switch being located within casing 5 at some point near the periphery of coupling 2 in order that its elements 60 and 62 will be subject to the fluid being discharged from the coupling through bleeds 30, and passages 36 and 38. The elements of this switch are so constructed that when fluid being discharged from the coupling reaches a predetermined maximum temperature, they will move together to close contact 64 completing circuit 56 and energizing solenoid 54. When the solenoid is energized, valve 44 will be moved upward to decrease the effect of the restriction in passage 42 and allow a greater quantity of fluid to flow into and through the coupling. Since this fresh supply of fluid will be at a lower temperature than the fluid in the chamber 14, it will result in a reduction of the coupling temperature to a safe operating limit.

It is to be understood that the invention is not limited to this specific embodiment herein illustrated and described, but may be used in other ways without departure from its spirit as defined by the following claims.

What it is desired to secure by Letters Patent is:

1. An hydraulic coupling of the type which transmits power in relation to the quantity of working fluid therein, means for providing a flow of fluid through said coupling, means responsive to the temperature of the fluid within the coupling for rapidly increasing the flow of fluid from said coupling, a fluid inlet to the coupling having a variable restriction therein and temperature responsive means operatively connected to said restriction for regulating the area thereof as a direct function of the temperature of the fluid discharged from the coupling.

2. An hydraulic coupling for transmitting power, said coupling having a casing, a ring surrounding the casing, said ring being of a material having a greater coefficient of expansion than said casing, passages for the removal of working fluid from said coupling when expansion of said ring occurs and means responsive to the temperature of the removed fluid for controlling fluid flow to said coupling.

3. An hydraulic coupling for transmitting power, said coupling having a casing, a ring surrounding the casing, said ring being of a material having a greater coefficient of expansion than said casing, passages for the removal of working fluid from said coupling when expansion of said ring occurs, a bimetallic switch against which working fluid flowing from said coupling impinges and a solenoid valve responsive to the bimetallic switch for controlling fluid flow to said coupling.

4. In apparatus for controlling the temperature of the fluid within the working chamber of a hydraulic coupling, a casing having a groove around its periphery, a ring mounted in said groove, said ring being of a material having a greater coefficient of expansion than said casing, means to permit the flow of fluid from said coupling, means controlled by said ring to increase the flow of fluid from said coupling in accordance with an increasing temperature of the fluid within said coupling, and means responsive to the temperature of the fluid flowing from said coupling to increase the flow of fluid to said coupling.

5. In apparatus for controlling the temperature of the fluid within the working chamber of a hydraulic coupling, a casing having a groove around its periphery, a ring within said groove and surrounding said casing, said ring being of a material having a greater coefficient of expansion than said casing, means to permit the flow of fluid from said coupling, means controlled by said ring to increase fluid flow from said coupling in accordance with an increasing temperature of the fluid within said coupling, a fluid supply passage to said coupling having a variable restriction therein, a bimetallic element against which fluid flowing from said coupling impinges, and means responsive to said bimetallic element to increase the area of said restriction when the temperature of the fluid flowing from the coupling exceeds a predetermined limit.

6. In apparatus for controlling the temperature of the fluid within the working chamber of a hydraulic coupling, a thermostatic element surrounding said coupling casing, passages to permit fluid flow from said coupling and means controlled by said thermostatic element to increase the fluid flow from said coupling in case of overheating, in combination with a second thermostatic element responsive to the temperature of the fluid flowing from said coupling, and a solenoid valve controlled by said second element for regulating the flow of fluid to said coupling.

7. In apparatus for controlling the temperature of the fluid within the working chamber of a hydraulic coupling, a ring mounted in a groove on the outer surface of the coupling casing, said ring being of a material having a greater coefficient of expansion than said casing so that said ring will expand at a faster rate than said casing due to an increase in the temperature of the coupling fluid, bleeds permitting a flow of fluid from said coupling, passages controlled by said ring for increasing the fluid flow from said coupling in accordance with a temperature rise of said fluid, a thermostatic switch against which fluid flowing from said coupling impinges and an electrically actuated valve responsive to said switch for regulating fluid flow to said coupling in accordance with the temperature rise of said fluid flowing from said coupling.

8. An hydraulic coupling adapted to be filled with a working fluid, a casing for the coupling, said casing having a groove on its periphery with bleed ports in said groove, a ring mounted in said groove and covering said ports, said ring having substantial clearance with the sides of said groove, radial passages in said ring aligning with said casing ports and being smaller in diameter than said ports, said passages and ports permitting fluid flow from the coupling during normal operation of said coupling, said ring being of a material having a greater coefficient of expansion than said casing so that fluid flow from said passages and ports will be supplemented by fluid flow around said ring as coupling temperature increases.

PHILIP P. NEWCOMB.

REFERENCES CITED

The following references are of record in the file of this patent:

UNITED STATES PATENTS

| Number | Name | Date |
| --- | --- | --- |
| 2,405,135 | Butzbach | Aug. 6, 1946 |
| 2,421,501 | Hasbrouck | June 3, 1947 |
| 2,459,734 | McCracken | Jan. 18, 1949 |

FOREIGN PATENTS

| Number | Country | Date |
| --- | --- | --- |
| 375,750 | Italy | Oct. 23, 1939 |